(12) United States Patent
Ritchie et al.

(10) Patent No.: US 7,018,603 B2
(45) Date of Patent: Mar. 28, 2006

(54) SYNTHESIS OF LITHIUM IRON SULPHIDES AND THEIR USE AS CATHODES

(75) Inventors: Andrew G Ritchie, Gosport (GB); Peter G Bowles, Gosport (GB)

(73) Assignee: Qinetiq Limited, Farnborough (GB)

( * ) Notice: Subject to any disclaimer, the term of this patent is extended or adjusted under 35 U.S.C. 154(b) by 355 days.

(21) Appl. No.: 10/433,680

(22) PCT Filed: Nov. 27, 2001

(86) PCT No.: PCT/GB01/05209

§ 371 (c)(1),
(2), (4) Date: Jun. 4, 2003

(87) PCT Pub. No.: WO02/46102

PCT Pub. Date: Jun. 13, 2002

(65) Prior Publication Data

US 2004/0018141 A1   Jan. 29, 2004

(30) Foreign Application Priority Data

Dec. 8, 2000   (GB) .................................... 0029958

(51) Int. Cl.
*C01G 49/12*   (2006.01)
*C01B 17/20*   (2006.01)
(52) U.S. Cl. .................... 423/511; 429/221; 429/231.95
(58) Field of Classification Search ................ 423/511; 429/221, 231.95
See application file for complete search history.

(56) References Cited

U.S. PATENT DOCUMENTS

| | | | |
|---|---|---|---|
| 4,164,069 A | 8/1979 | Tomczuk | |
| 4,172,926 A * | 10/1979 | Shimotake et al. | 429/112 |
| 4,223,078 A | 9/1980 | Armand et al. | |
| 4,401,714 A * | 8/1983 | Otto et al. | 429/221 |
| 4,640,832 A | 2/1987 | Bittner et al. | |
| 4,676,970 A * | 6/1987 | Todd et al. | 423/561.1 |
| 4,731,307 A | 3/1988 | Guidotti | |
| 4,761,487 A * | 8/1988 | Godshall | 429/112 |
| 6,207,327 B1 * | 3/2001 | Takada et al. | 429/304 |
| 6,210,836 B1 * | 4/2001 | Takada et al. | 429/231.95 |
| 6,740,301 B1 * | 5/2004 | Ritchie et al. | 423/511 |
| 2003/0138695 A1 * | 7/2003 | Guidotti et al. | 429/221 |
| 2005/0048370 A1 * | 3/2005 | Guidotti et al. | 429/221 |

FOREIGN PATENT DOCUMENTS

| | | |
|---|---|---|
| FR | 2 485 267 | * 12/1981 |
| GB | 2 175 292 A | 11/1986 |
| GB | 2351075 | 12/2000 |
| WO | 00/78673 | 12/2000 |

OTHER PUBLICATIONS

Takada et al; "Lithium Iron Sulfide as an Electrode Material in a Solid State Lithium Battery"; Solid State Ionics, North Holland Pub. Company. Amsterdam, NL., vol. 117, No. 3-4, Feb. 2, 1999, pp. 273-276, XP004154434.
Derwent, Abstract 1988-265035, EP 0326914 (published Aug. 9, 1989).
Saboungi et al; "Solubility Products for Metal Sulfides in Molten Salts"; J. Electrochem. Soc., vol. 125, No. 10, Oct. 1978, pp. 1567-1573, XP002190661.

* cited by examiner

*Primary Examiner*—Stanley S. Silverman
*Assistant Examiner*—Ardith E Hertzog
(74) *Attorney, Agent, or Firm*—Nixon & Vanderhye P.C.

(57) ABSTRACT

A process for the production of a lithium transition metal sulphide such as lithium iron sulphide, the process comprising reacting a transition metal sulphide with lithium sulphide in a solvent comprising a molten salt or a mixture of molten salts. Lithium transition metal sulphides obtained using this process are useful in the production of electrodes, in particular for rechargeable lithium batteries.

3 Claims, 6 Drawing Sheets

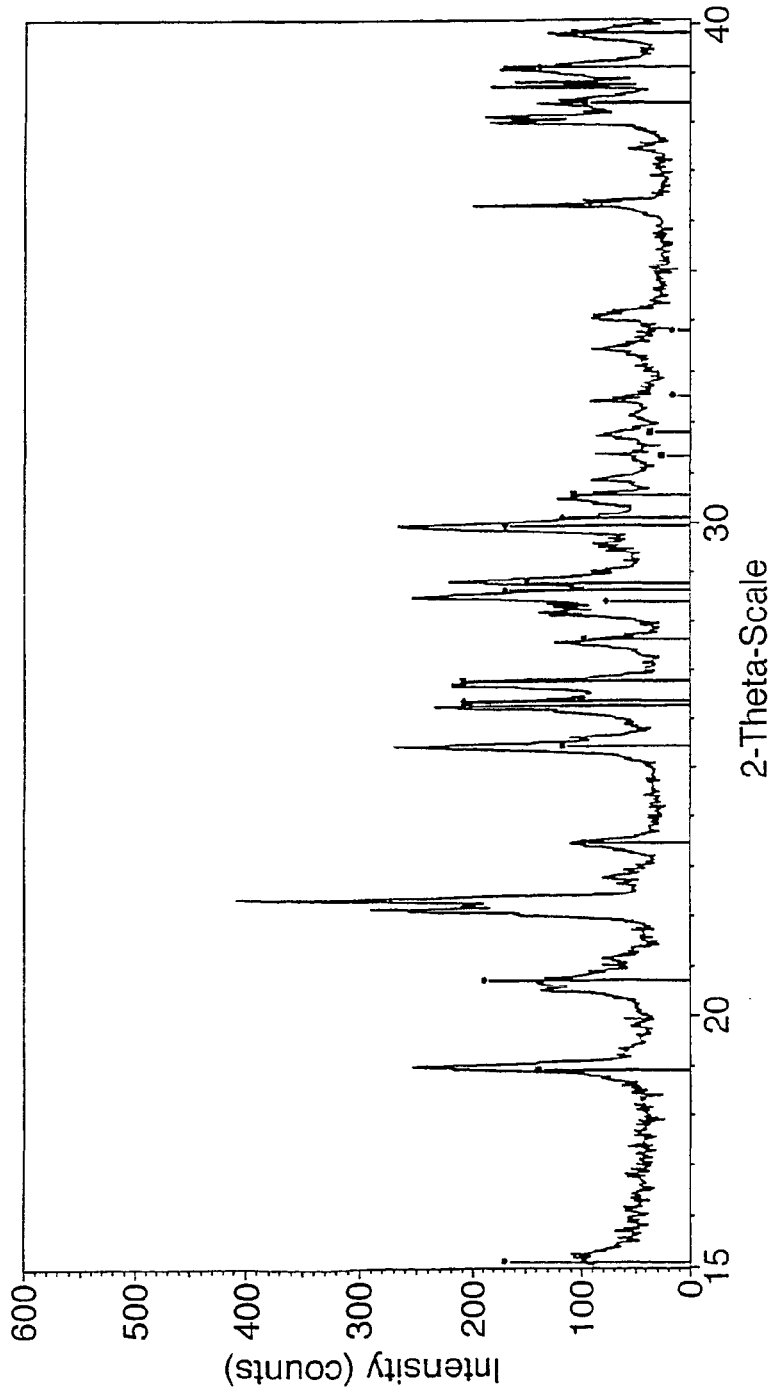

SYNTHESIS OF LITHIUM IRON SULPHIDES AND THEIR USE AS CATHODES

CROSS REFERENCE TO RELATED APPLICATION

This application is the US national phase of international application PCT/GB01/05209 filed 27 Nov. 2001, which designated the US.

The present invention relates to processes for the production of sulphides, in particular lithium transition metal sulphides useful in the production of batteries.

BACKGROUND OF THE INVENTION

In the 1980's, there was extensive research into lithium metal rechargeable batteries, particularly using sulphides, but also selenides, as cathode materials. Many lithium metal/molybdenum disulphide (Li/MoS$_2$) batteries were produced but these were withdrawn following an incident in which a fire was attributed to the malfunction of such a battery. Other sulphides, such as iron disulphide FeS$_2$, titanium disulphide TiS$_2$ and selenides, such as niobium triselenide NbSe$_3$ have also been particularly investigated as alternative cathode materials.

Although the use of lithium metal rechargeable batteries is now limited for reasons of safety, they are still used in the laboratory testing of materials. Lithium metal primary batteries using iron disulphide cathodes are manufactured.

Virtually all modern lithium rechargeable batteries are of the lithium-ion type, in which the negative electrode (anode) comprises lithium absorbed into a carbon support. These use a lithium containing cathode material, which is usually lithium cobalt oxide LiCoO$_2$ although lithium nickel oxide LiNiO$_2$, lithium manganese oxide LiMn$_2$O$_4$ and mixed oxides are also known to have been used.

Due to their high cost, the use of lithium rechargeable batteries at present is mainly limited to premium applications, such as portable computers or telephones. To gain access to wider markets, for example in applications such as the powering of electric vehicles, the cost must be reduced. Hence there is a strong demand for the high performance obtainable from lithium-ion batteries at much more economical prices.

On first inspection, the use of sulphides as cathode materials is not as attractive as the use of oxides. This is because the voltage achievable from sulphides is generally only about half of that achievable using corresponding oxides. However, the capacity of batteries incorporating sulphide based cathodes, measured in ampere hours per gram of material, is about 3 times greater than corresponding batteries incorporating oxide based cathodes. This leads to an overall advantage of about 1.5 times in terms of cathode energy density for batteries with sulphide based cathodes. A further advantage is that iron sulphides, in particular ferrous sulphide (FeS) and iron disulphide (FeS$_2$) are inexpensive materials which may be dug out of the ground as natural occurring minerals. By contrast, lithium cobalt oxide is an expensive material, due mainly to the high cost of cobalt metal.

Binary transition metal sulphides are however not suitable for direct use in lithium-ion cells as they do not contain lithium. Lithium transition metal ternary sulphides, such as lithium molybdenum sulphide, lithium titanium sulphide, lithium niobium sulphide and lithium iron sulphide have been suggested as electrode materials for batteries (see for example, Japanese Kokai No 10208782 and Solid State Ionics 117 (1999) 273–276). The conventional synthesis of lithium iron sulphide is via a solid state reaction in which lithium sulphide, Li$_2$S, and ferrous sulphide, FeS, are intimately mixed together and heated under an inert atmosphere at a temperature of ca. 800° C. The reaction is diffusion controlled and the kinetics are slow. Consequently, the reaction can take up to 1 month at temperature to reach completion. This is highly inconvenient and is costly in terms of energy input. The economics of this synthesis for battery production are clearly unfavourable.

On a laboratory scale, lithium iron sulphide can be made by an electrochemical synthesis route in which a lithium metal/iron disulphide cell is discharged, and the lithium metal is removed and replaced by a carbon anode. This process however, is not amenable to scaling up. A further laboratory synthesis of lithium iron sulphide is the solid state reaction of lithium nitride, Li$_3$N, with iron disulphide, FeS$_2$, but again, this method is unsuitable for large scale use because of the high cost and shock sensitivity of lithium nitride.

The applicants have developed an economical synthesis which can be operated on a large scale to produce sulphides which have useful electrochemical properties.

BRIEF DESCRIPTION OF THE DRAWINGS

The invention will now be particularly described by way of example only with reference to the following drawings in which.

DESCRIPTION OF THE INVENTION

Figure 1:
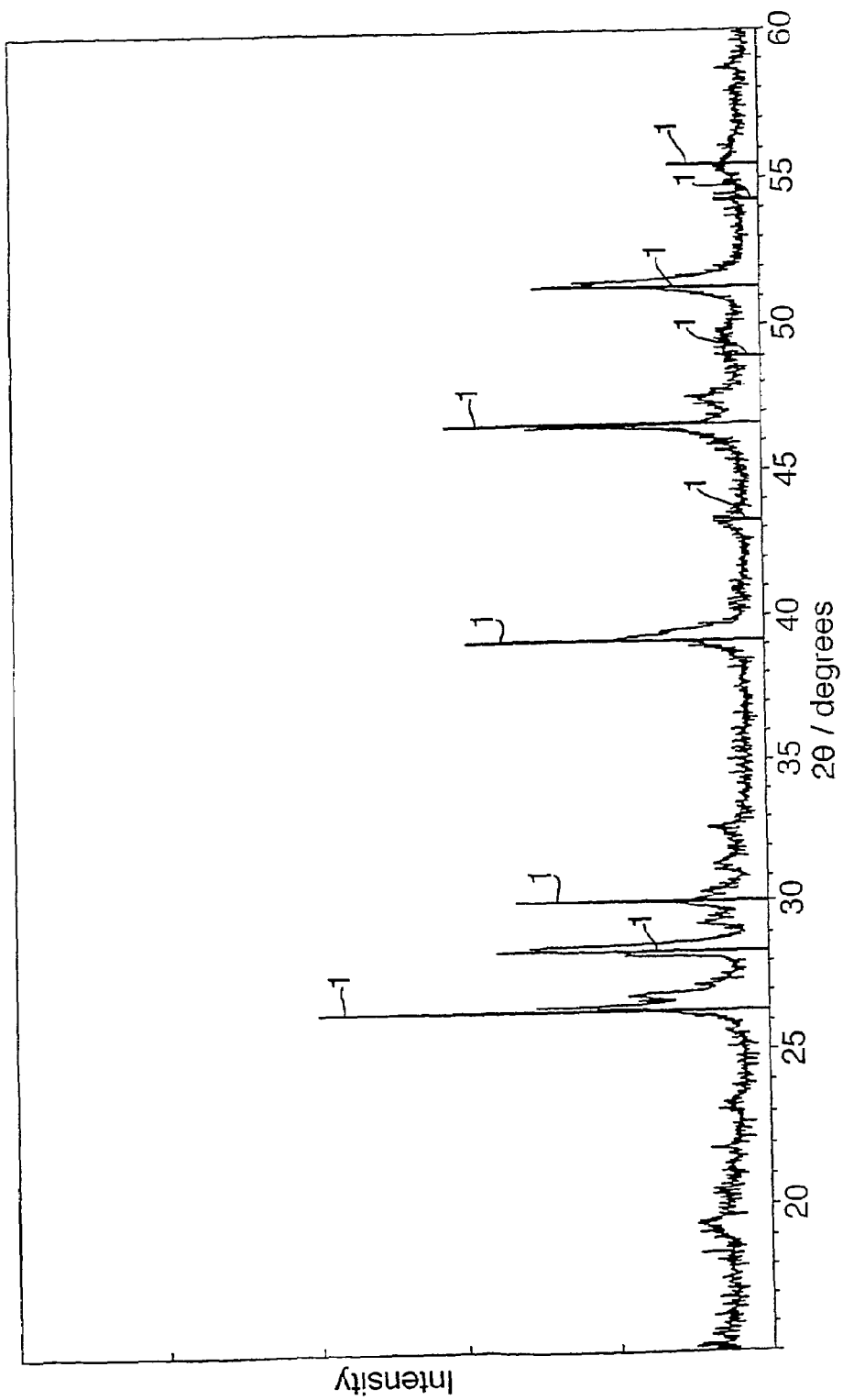
FIG. 1 shows an x-ray diffraction trace for the product obtained using a first example of a process according to the present invention.

In accordance with the present invention a process for the production of a lithium transition metal sulphide comprises reacting a transition metal sulphide with lithium sulphide in a solvent comprising a molten salt or a mixture of molten salts.

Suitably the transition metal sulphide used in the process is an iron, molybdenum, niobium or titanium sulphide and is preferably an iron sulphide. Ferrous sulphide, FeS, and iron disulphide, FeS$_2$, are inexpensive and readily available naturally occurring minerals.

Preferably the molten salt or mixture of molten salts comprises an alkali metal halide or a mixture of alkali metal halides, or an alkaline earth metal halide or a mixture of alkaline earth metal halides, or any mixture thereof. More preferably, the molten salt or mixture of molten salts comprises a lithium halide or a mixture of lithium halides.

Most preferably, the molten salt or mixture of molten salts comprises at least one of lithium fluoride, lithium chloride, lithium bromide or lithium iodide.

The reaction temperature should be sufficient to liquefy the molten salt or mixture of molten salts. This need not necessarily be the melting point of the molten salt or mixture of molten salts as the addition of the reactants may depress the melting point. Typically, reaction temperatures of less than 1000° C. and most often less than 700° C. are suitable, however dependent on the choice of solvent, reaction temperatures of less than 300° C. may be used.

The reaction proceeds more rapidly than previously known processes. On a laboratory scale, the reaction can be completed in a few hours, with the actual reaction time dependent largely on the heating time of the furnace.

Although lithium sulphide may be bought commercially, for large scale production it is more economical to produce lithium sulphide via the reduction of lithium sulphate. One convenient method is to heat lithium sulphate above its melting point of 860° C. in the presence of carbon. Other standard reduction methods may equally be used, as well known in the art.

After the reaction is complete and allowed to cool, the product must be recovered from the solvent. Suitably the product is recovered by dissolution of the solvent in an organic liquid. The organic liquid chosen is dependent on the composition of the solvent used, however some examples include, pyridine, ether and acetonitrile which are suitable for the dissolution of lithium chloride, lithium bromide and lithium iodide respectively. Numerous other suitable liquids will be known to those skilled in the art. When a mixed salt solvent is used it may be necessary to perform more than one dissolution process. For example, a reaction using a mixture of lithium chloride and lithium bromide as a solvent may require a first dissolution process using pyridine to remove the lithium chloride, followed by a second dissolution process using ether to remove the lithium bromide.

The present invention further provides a process for producing at least one lithium transition metal sulphide by reacting a transition metal sulphide with lithium sulphide in the presence of a molten salt or mixture of molten salts. A plurality of lithium transition metal sulphides may be made by such a process and subsequently separated.

In a further aspect, there is provided a process for producing one or more lithium transition metal sulphides by reacting one or more transition metal sulphides with lithium sulphide in the presence of a further salt with which they do not react, in an inert atmosphere, wherein the salt and at least one component are in a molten state to allow intimate mixing, the salt preferably acting as a solvent for said at least one component.

Lithium transition metal sulphides obtained by the above described process form a further aspect of the invention. These compounds are useful in the production of electrodes for use in batteries. In particular, they are useful in the production of electrodes for rechargeable batteries. These electrodes form the cathode, and suitable anodes are lithium ion anodes as are known in the art. Suitable electrolytes are also well known and include mixtures of inorganic carbonates, for example ethylene carbonate, propylene carbonate, diethyl or dimethyl carbonates, ethyl methyl carbonate together with a lithium salt, usually lithium hexafluorophosphate, $LiPF_6$, or lithium trifluoromethane sulphonate ('triflates'), $LiCF_3SO_3$ or lithium tetrafluoroborate, $LiBF_4$.

Molten salts and mixtures of molten salts are not conventional solvents and their use, acting like solvents in the production of sulphides, therefore forms a further aspect of the invention. As described above, they are particularly suitable for use as solvents in reactions used in the production of lithium transition metal sulphides.

DESCRIPTION OF THE PREFERRED EMBODIMENTS

Lithium iron sulphide, $Li_2FeS_2$ was synthesised according to the following equation:

Stoichiometric amounts of lithium sulphide, $Li_2S$, and iron sulphide, FeS, were intimately mixed with a roughly equivalent weight of a salt or mixture of salts which constituted the solvent. The resulting mixture was placed into a nickel crucible and heated under an inert atmosphere to effect reaction. After the reaction was complete, the crucible and its contents were allowed to cool while still under an inert atmosphere, before being transferred to an inert atmosphere glove box. The salt or mixture of salts was then removed from the desired product by refluxing the powdered contents of the crucible with an organic liquid. After filtering and drying, the resultant product was analysed by x-ray powder diffraction (XRD) using a Philips PW1830 Diffractometer and $CuK\alpha$ radiation.

Cell cycling tests were carried out on the product as follows. Cathode sheets were made by the doctor blade method. The product was mixed with graphite and a solution of ethylene propylene diene monomer (EPDM) in cyclohexane to form a slurry. This was then coated onto an aluminium backing sheet. Negative electrodes were made by a similar method except that the active material was carbon in the form of graphite with some carbon black added, the binder was polyvinylidene fluoride dissolved in N-methylpyrrolidinone (NMP) and the metallic backing sheet was copper. The electrolyte was ethylene carbonate (EC)/diethyl carbonate (DEC)/1 molar lithium hexafluorophosphate ($LiPF_6$). Cells were cycled at room temperature. This cell cycling procedure is described in more detail by A. Gilmour, C. O. Giwa, J. C. Lee and A. G. Ritchie, in the Journal of Power Sources, volume 65, pages 219–224.

EXAMPLE 1

$Li_2S$ and FeS were reacted together in a molten salt solvent of lithium chloride, LiCl, at 650° C. for ca. 2 hours, under an argon atmosphere. After completion, the LiCl was removed by refluxing in pyridine for 8 hours. FIG. 1 shows an XRD trace of the product obtained. The vertical lines 1 represent the standard trace for pure $Li_2FeS_2$ taken from the JCPDS database. The main peaks are co-incident with and have similar relative intensities to these lines 1, indicating that the dominant product phase obtained was $Li_2FeS_2$. The remaining peaks correspond to small amounts of unreacted starting materials.

Figure 2:
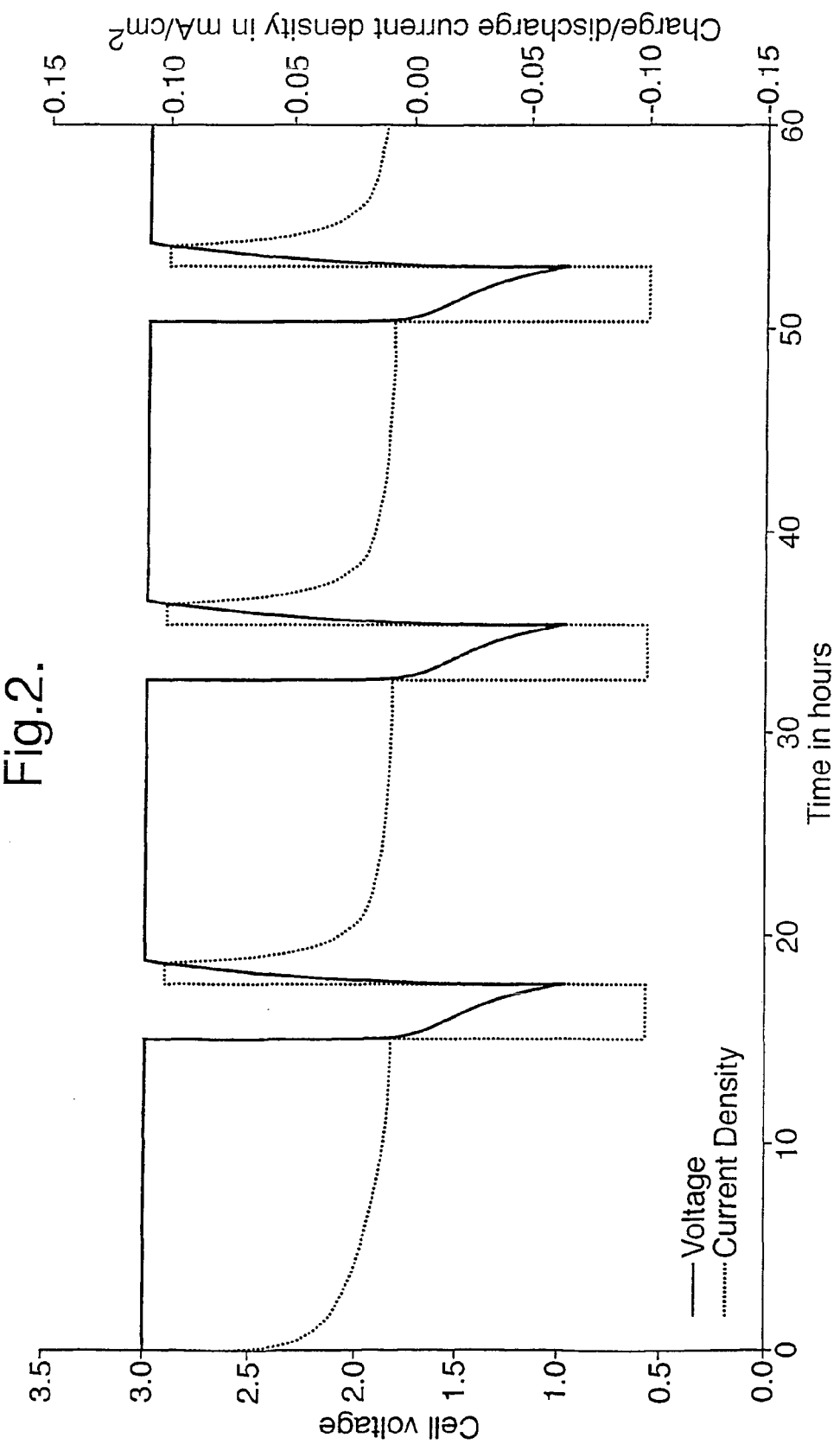
FIG. 2 shows cycling curves for the product obtained using a first example of a process according to the present invention.

The product obtained was used to manufacture a cathode as described above. FIG. 2 illustrates three cycling curves which indicate that the cathode could be repeatedly charged and discharged. This demonstrates that the product was suitable for use as a cathode material for a lithium rechargeable battery.

EXAMPLE 2

Figure 3:
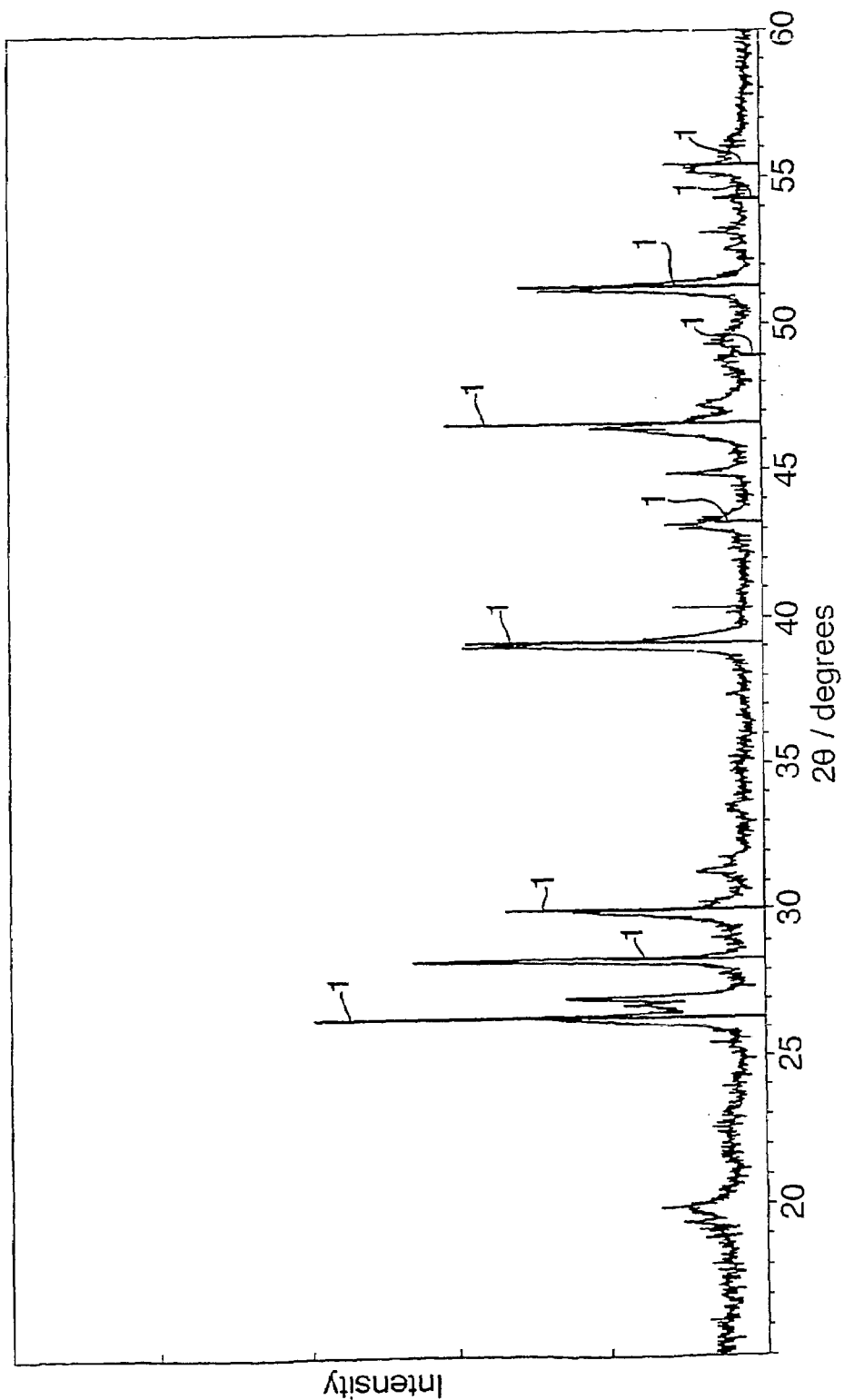
FIG. 3 shows an x-ray diffraction trace for the product obtained using a second example of a process according to the present invention.

$Li_2S$ and FeS were reacted together in a molten salt solvent of lithium bromide, LiBr, at 550° C. for ca. 2 hours, under an argon atmosphere. After completion, the LiBr was removed by refluxing in diethyl ether for 8 hours. FIG. 3 shows an XRD trace of the product obtained. The vertical lines 1 represent the standard trace for pure $Li_2FeS_2$ taken from the JCPDS database. The main peaks are co-incident with and have similar relative intensities to these lines 1, indicating that the dominant product phase obtained was $Li_2FeS_2$. The remaining peaks correspond to small amounts of unreacted starting materials.

EXAMPLE 3

Figure 4:
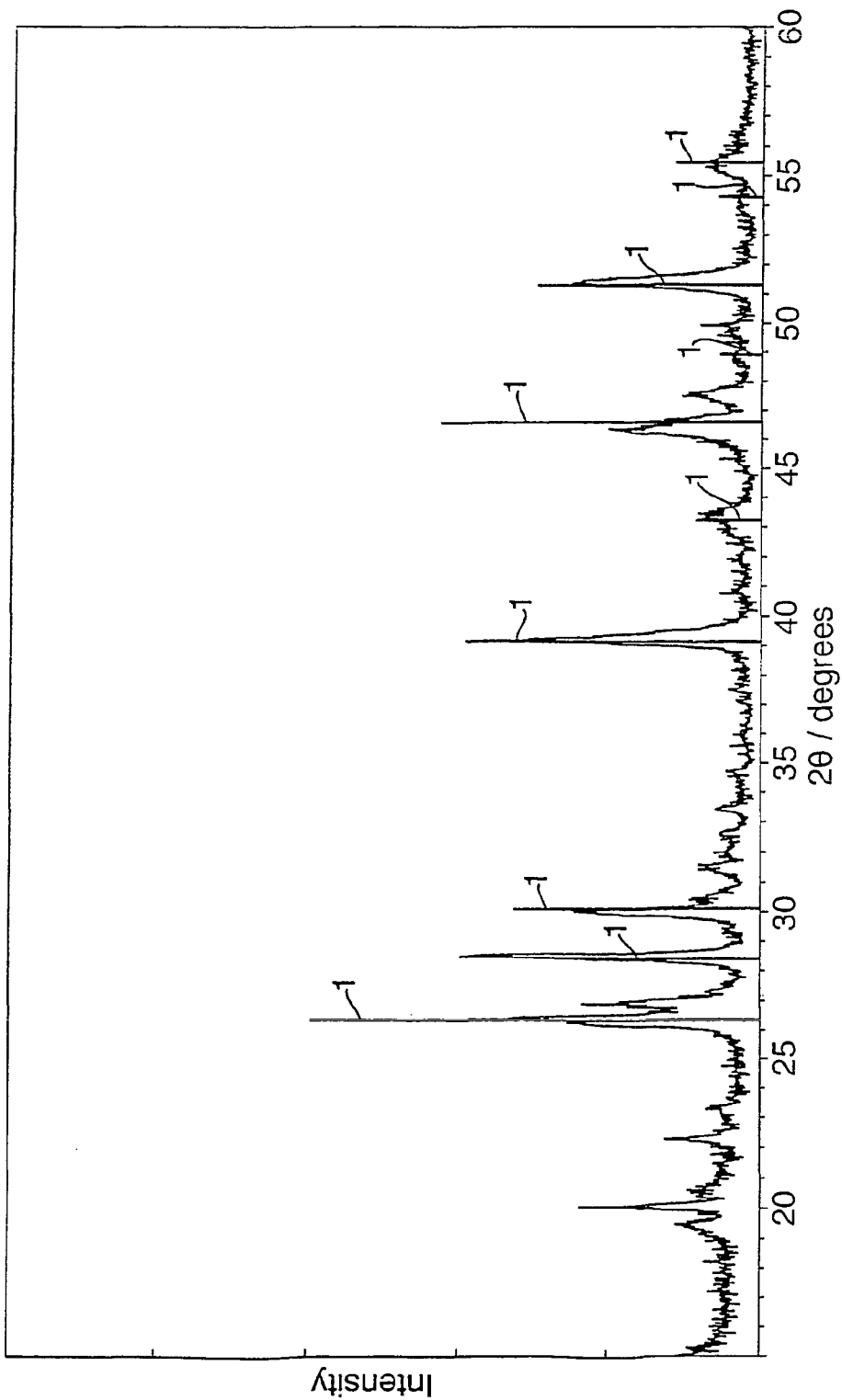
FIG. 4 shows an x-ray diffraction trace for the product obtained using a third example of a process according to the present invention.

$Li_2S$ and FeS were reacted together in a molten salt solvent of lithium iodide, LiI, at 450° C. for ca. 2 hours, under an argon atmosphere. After completion, the LiI was removed by refluxing in acetonitrile for 8 hours. FIG. 4 shows an XRD trace of the product obtained. The vertical lines 1 represent the standard trace for pure $Li_2FeS_2$ taken from the JCPDS database. The main peaks are co-incident with and have similar relative intensities to these lines 1, indicating that the dominant product phase obtained was $Li_2FeS_2$. The remaining peaks correspond to small amounts of unreacted starting materials.

Figure 5:
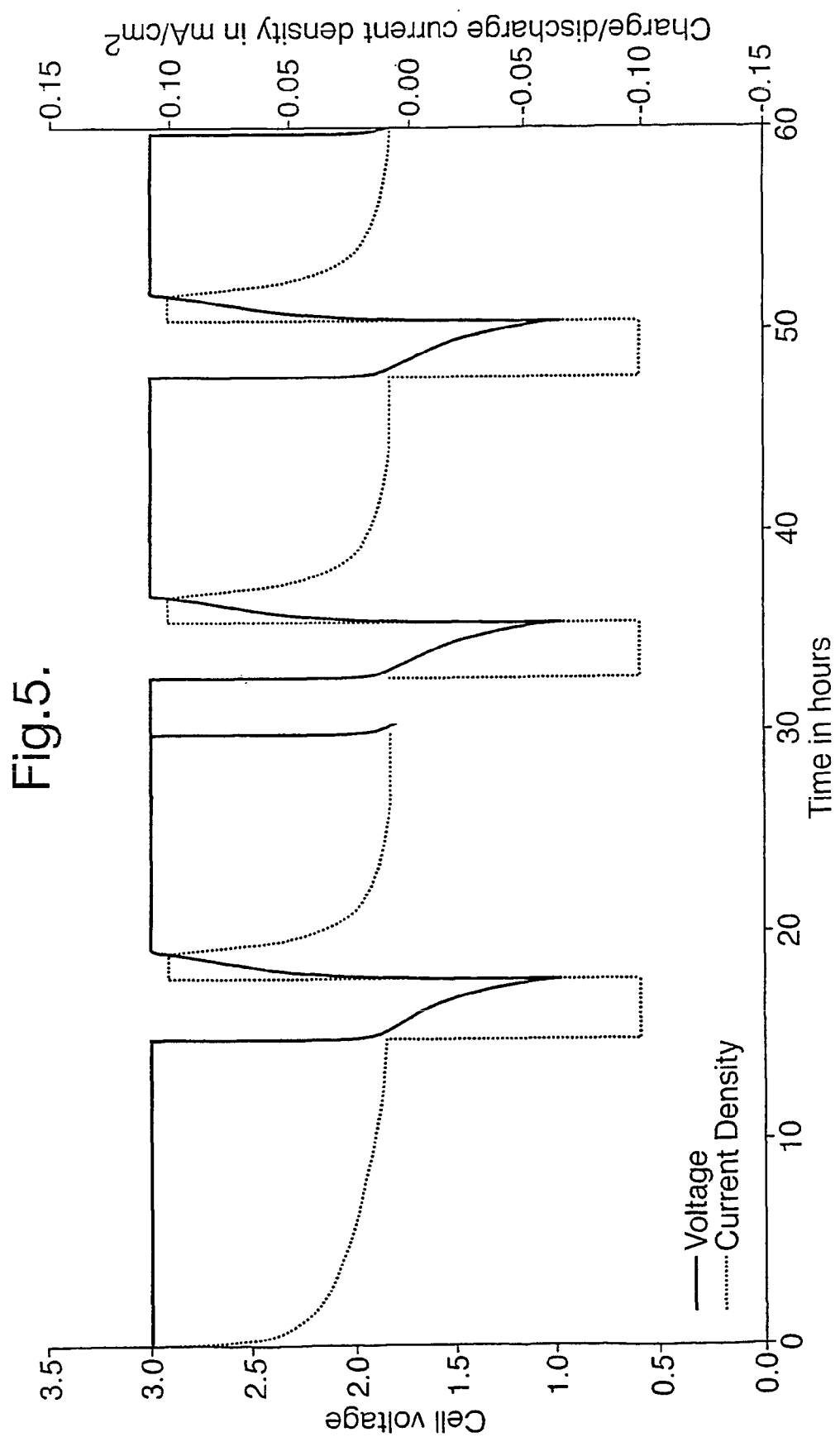
FIG. 5 shows cycling curves for the product obtained using a third example of a process according to the present invention; and, FIG. 6 shows an x-ray diffraction trace for the product obtained using a fourth example of a process according to the present invention.

The product obtained was used to manufacture a cathode as described above. FIG. 5 illustrates three cycling curves which indicate that the cathode could be repeatedly charged and discharged. This demonstrates that the product was suitable for use as a cathode material for a lithium rechargeable battery.

EXAMPLE 4

$Li_2S$ and $FeS_2$ were reacted together in a molten salt solvent of lithium chloride, LiCl, at 700° C. for ca. 2 hours, under an argon atmosphere. After completion the lithium chloride was removed by refluxing in pyridine for 8 hours. FIG. 6 shows an XRD trace of the product obtained. The main peaks are coincident with the lithium iron sulphides, $Li_3Fe_2S_4$, $Li_2FeS_2$ and $Li_{2.33}Fe_{0.67}S_2$. Unlike the other examples, a single pure product was not obtained. These products are known to be suitable as battery cathode materials (A. G. Ritchie and P. G. Bowles, Process for Producing a Lithium Transition Metal Sulphide, WO 00/78673 A1, 28 Dec. 2000).

The examples described above demonstrate that the process of the present invention is suitable for use in the production of $Li_2FeS_2$ and that the product so obtained can be used as a cathode material in the manufacture of lithium rechargeable batteries. The process is significantly quicker and requires considerably less energy input than the conventional solid state synthesis of lithium iron sulphide. This leads to significant reductions in the cost of the material.

Although described with reference to the production of lithium iron sulphide, it will be clear that the process could equally be used to produce other lithium transition metal sulphides.

The invention claimed is:

1. A process for the synthesis of lithium iron sulphide $Li_2FeS_2$, in which reactants consisting of lithium sulphide $Li_2S$ and iron sulphide FeS react, under an inert atmosphere, in a solvent consisting essentially of a molten lithium halide salt, or a mixture of molten lithium halide salts, so as to produce $Li_2FeS_2$ as the dominant product phase, and recovering the product by dissolution of the molten salt or mixture of molten salts in at least one organic liquid.

2. The synthesis process according to claim 1 wherein the molten lithium halide salt or mixture of molten lithium halide salts comprises at least one of lithium fluoride, lithium chloride, lithium bromide or lithium iodide.

3. The process for manufacturing a cathode comprising producing lithium iron sulphide $Li_2FeS_2$ by a process according to claim 1, and subsequently using the sulphide so produced to manufacture the cathode.

* * * * *